United States Patent [19]
Baldwin et al.

[11] 3,788,746
[45] Jan. 29, 1974

[54] OPTICAL DILATOMETER

[75] Inventors: Richard R. Baldwin, Saratoga; Bruce J. Ruff, Sunnyvale, both of Calif.

[73] Assignee: Hewlett-Packard Company, Palo Alto, Calif.

[22] Filed: Oct. 2, 1972

[21] Appl. No.: 294,114

[52] U.S. Cl. ................................ 356/106, 356/113
[51] Int. Cl. ............................................. G01b 9/02
[58] Field of Search ............................ 356/106–113

[56] References Cited
OTHER PUBLICATIONS
"A Double Passed Michelson Interferometer," Optics Communications, Feb. 1972, pp. 428–430.

*Primary Examiner*—John K. Corbin
*Assistant Examiner*—Conrad Clark
*Attorney, Agent, or Firm*—Roland I. Griffin

[57] ABSTRACT

A dilatometer for measuring the linear coefficient of expansion of a specimen block wrung on a platen. The measurement is made by electronically comparing a set of fringes that are responsive to motion of the sample to a set of fringes that are responsive to motion of the platen. Each set of fringes is generated by interference between a reference light beam and a light beam which has twice traversed the distance to the surface whose motion is being monitored, the two traversals being along separate but parallel paths. Each of the two sets of fringes is generated at the surface of the main beam splitter by recombining beams which have been reflected from cube-corners so that there is no requirement for a separate, precisely aligned, output beam splitter.

3 Claims, 2 Drawing Figures

PATENTED JAN 29 1974          3,788,746

OPTICAL DILATOMETER

BACKGROUND OF THE INVENTION

This invention relates generally to interferometry, and more particularly to an improved method of dilatometry. A standard Fizeau-type dilatometer utilizes visual observation of interference fringes between a polished test block and an optical plate to determine the relative expansion between the test block and a set of screws which support the optical plate above the test block. Since the interference fringes result from a wedge shaped spacing between the test block and the optical plate, the device is sensitive to spurious tilting of the test block or the optical plate. Also, in order to extract the absolute co-efficient of expansion of the test block from this data, it is necessary to independently determine the absolute coefficient of expansion of the screws. A dilatometer which eliminates these difficulties was suggested in a recent article by S. J. Bennet, "A Double-Passed Michelson Interferometer," *Optics Communications*, Vol. 4, Number 6 (Feb/Mar 1972). He proposed a method of dilatometry using a polarizing beam splitter and an optical cube-corner. Bennet's proposed method utilizes the geometry of the beam splitter and cube-corner to reflect a first light beam twice from the surface of a platen to which a specimen is wrung. The optical paths involved in each reflection are parallel to each other and located symmetrically with respect to a line normal to the surface. Optical interference fringes are formed at the surface of an output beam splitter between the first light beam and a second light beam which has been twice reflected from the surface of the specimen in a similar manner. Since the distances involved are determined by detecting light that has been twice reflected from the surfaces of the specimen and platen in the symmetrical manner described, the device is insensitive to translation or rotation. Only the linear expansion of the specimen in the direction normal to the surface is detected, so that the linear co-efficient of expansion may be directly determined.

In Bennet's device however, the initial splitting of the incident light beam into two beams is done in an auxiliary input beam splitter which is only traversed once by the light beam. Similarly, the recombination of the output beams to form optical fringes is done in an auxiliary output beam splitter which is again traversed only once by the light beam. For accurate fringe detection the wavefronts of the emergent beams must be parallel at the output beam splitter. This requires that the input and output beam splitters be aligned within very strict tolerances, (for instance 10 arcseconds as suggested in the Bennet article). To manufacture and maintain these tolerances is both difficult and expensive, but necessary.

SUMMARY OF THE INVENTION

Accordingly, it is an object of the present invention to measure the linear expansion of a specimen wrung on a platen by means which are insensitive to translation or rotation of the specimen or platen, but which do not require precise alignment of the various optical components of the system.

It is another object of the present invention to generate and detect the interference fringes in such a way that the sensitivity of the device may be greatly increased electronically through the use of a resolution extender.

The present invention achieves these objectives by eliminating the need for a precisely aligned output beam splitter at which fringes are formed by interference between the beam reflected from the sample and the beam reflected from the platen. Instead, a first set of fringes are generated between a beam which has twice traversed the distance to the specimen along separate but parallel paths, and a reference beam which has been reflected from a cube-corner. To determine the linear expansion of the specimen, this first set of fringes is compared electronically with a second set of fringes generated between a beam which has twice traversed the distance to the platen along separate but parallel paths and another reference beam which has been reflected from the same cube-corner. The optical interference that generates each set of fringes takes place at the surface of the same beam splitter used to direct the incoming beams along their respective paths. Consequently, there is no requirement for precisely aligned input or output beam splitters in order to assume that the interfering beams will be parallel at the surface where interference takes place.

Furthermore, since the distance measurement is achieved by comparing the two sets of fringes electronically it is possible to interpose a resolution extender circuit that greatly increases the sensitivity of the dilatometer.

DESCRIPTION OF THE PREFERRED EMBODIMENTS

Figure 1:
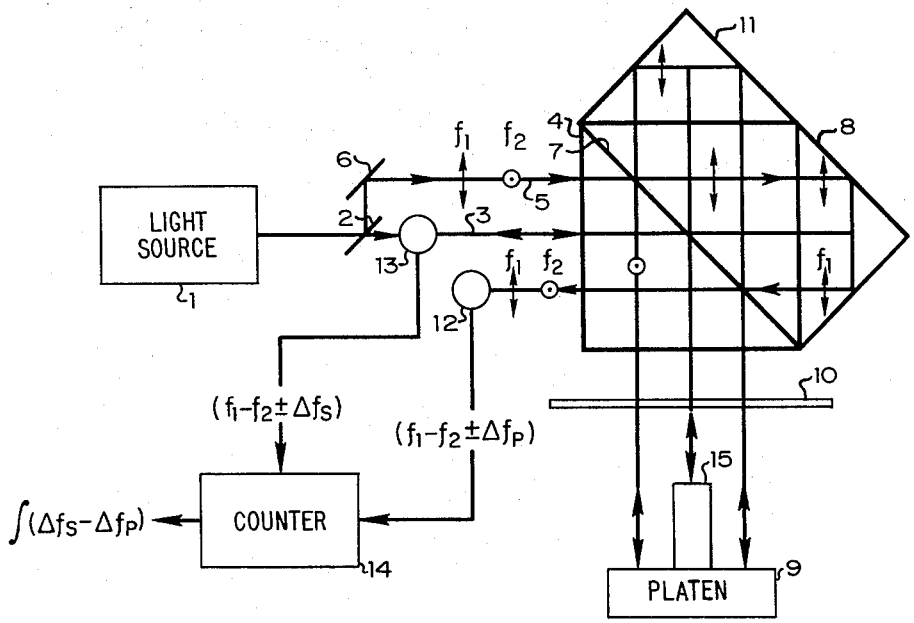
FIG. 1 is a diagram of a preferred embodiment of an optical dilatometer.

The invention may be understood in detail by reference to FIG. 1. The dilatometer uses a light source 1, which in this preferred embodiment is a two-frequency laser producing a two-frequency output beam having a first component of frequency $f_1$ linearly polarized in the plane of the drawing (indicated by a vertical line) and having a second component of frequency $f_2$ linearly polarized perpendicular to the plane of the drawing (indicated by a circle). A beam splitter 2 transmits a part 3 of the two frequency beam directly toward a polarizing beam splitter 4, and reflects another part 5 of the two-frequency beam toward a mirror 6, which in turn reflects that part of the beam toward the polarizing beam splitter 4. At the surface 7 of the polarizing beam splitter 4, the part 5 of the two-frequency beam is divided again. Two components of different frequencies and different polarizations are directed along different paths, the component of frequency $f_1$ and vertical polarization being transmitted to a cube-corner 8, and the component of frequency $f_2$ and horizontal polarization being reflected toward the surface of a platen 9. The $f_2$ component passes through a quarter wave plate 10 and is reflected from the surface of platen 9 back along the same path to the surface 7 of beam splitter 4. Having passed twice through the quarter wave plate 10, the polarization of the $f_2$ component has been converted to vertical polarization, so that this $f_2$ component is now transmitted through the beam splitting surface 7 to the reflecting cube-corner 11. The $f_2$ component is reflected from the cube-corner 11 and transmitted again through the beam splitting surface 7 and the quarter wave plate 10 back to the surface of the platen 9. It is there reflected once again back through the quarter wave plate 10 to the beam splitting surface 7. As a result of again having passed twice through the quarter wave plate 10, the polarization is horizontal. Hence, the $f_2$ component is now reflected by the beam splitting surface 7 toward a detector 12. In the meantime, the component beam of frequency $f_1$ and vertical polarization has been reflected by cube-corner 8 and transmitted through beam splitting surface 7 to the same detector 12. The detector 12 uses a mixing polarizer and a photoelectric detector in a well-known manner (see for example FIG. 2 in U.S. Pat. No. 3,458,259 by A. S. Bagley, et al.) to mix the two component beams. The frequency of the output signal is the difference between $f_1$ and $f_2$ doppler shifted by an amount dependent on the motion of the surface of the platen 9 in the direction normal to that surface. The measurement is manifestly independent of small translations of the platen parallel to the surface. It is also independent of small rotations about an axis in the plane of the drawing and normal to the surface or about an axis in the plane of the drawing and parallel to the surface. Additionally, however, as was pointed out by Bennet, since the beam traverses the distance from the polarizing beam splitter to the platen twice, as shown in the figure, the measurement is also insensitive to small rotations of the platen about an axis perpendicular to the plane of the drawing; any such small rotation about an axis located midway between the two beams will lengthen one optical path slightly, but shorten the other by a like amount, the total optical path length thus being unaffected by the small rotation. If the axis does not lie midway between the beams, the same results hold, since the resultant tilt may be resolved into two translations and one rotation about an axis lying midway between the beams.

An entirely similar discussion can be made with reference to a pair of component beams whose interference pattern is responsive to motion of the sample 15. These beams are the two components of part 3 of the two frequency beam that was transmitted by the beam splitter 2 directly toward the polarizing beam splitter 4. All of the action takes place in a plane perpendicular to the plane of the drawing, the interfering beams finally being directed to a detector 13. However, the geometry is the same as the geometry governing the measurement of the platen motion, described above. Thus, the measurement of the distance to the surface of the specimen will also be insensitive to small displacements parallel to the surface and to small rotations about any axis.

It is to be noticed that in the present invention the beam which has traversed the distance to the platen does not interfere directly with the beam which has traversed the distance to the specimen. Rather, interference takes place between the beam which has traversed the distance to the platen and a reference beam which has traversed a fixed distance to a cube-corner reflector. It is to be further noticed that the interference between these beams takes place at the surface 7 of the polarizing beam splitter 4, the geometry of the system ensuring that the interfering beams will be parallel. In the same way optical interference between the beam which has twice traversed the distance to the sample and its associated reference beam (which has traversed exactly the same distance through the same cube-corner as the first reference beam) also takes place at the surface 7 of the polarizing beam splitter 4. The invention thus eliminates the need for a separate, precisely aligned output beam splitter to produce optical interference between parallel beams.

The actual measurement of the expansion of the sample is made by comparing the output signals from the detectors 12 and 13 in an electronic reversible counter 14 which integrates the difference between the frequencies of those signals. The output of the counter 14 is thus proportional to the accumulated difference in displacements between the surface of the sample and the surface of the platen. A knowledge of the temperature change undergone by the sample then allows a simple calculation of its linear coefficient of expansion.

Figure 2:
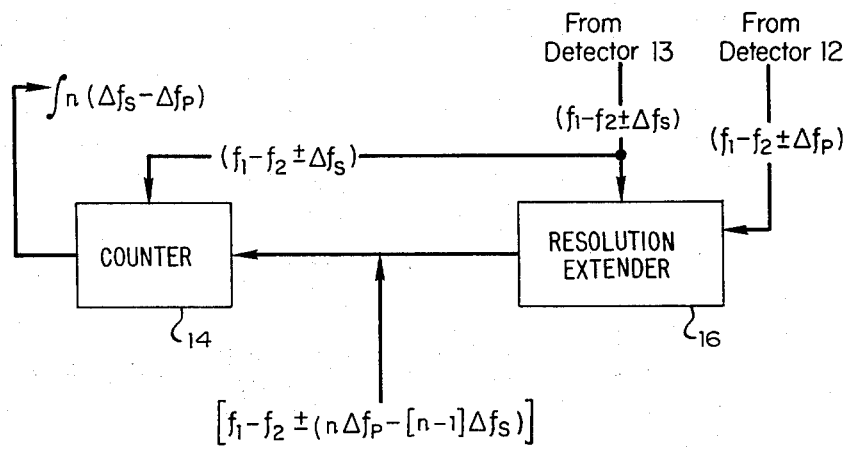
FIG. 2 is a diagram showing the use of a resolution extender in conjunction with an optical dilatometer.

Referring now to FIG. 2, there is shown an electronic resolution extender 16 used in conjunction with the dilatometer. The output signals from the detectors 12 and 13 are directed to the resolution extender 16, which multiplies the doppler shift $\Delta f_p$ of the beam monitoring the platen by an integer $n$, and multiplies the doppler shift $\Delta f_s$ of the beam monitoring the sample by an integer $(n-1)$. The output of the resolution extender is then compared in the reversible counter 14 with the output of the detector 13 whose doppler shift $\Delta f_s$ depends directly on the motion of the sample. The reversible counter will thus produce an output proportional to the accumulated difference in the displacements between the surface of the sample and the surface of the platen, but multiplied by the factor $n$.

This resolution extension is of particular importance in dilatometric applications, since it is often necessary to detect very small displacements.

We claim:

1. A dilatometer comprising:

source means for producing a light beam;

a first beam splitter for splitting the light beam into two beams, and for directing each of these two beams along a different optical path;

optical means including a second beam splitter for splitting one of said two beams into a first component and a second component, directing said first component to the surface of a specimen on a platen in such a way that said first component traverses the round trip distance to said specimen twice along separate but parallel paths, and directing said second component along a first reference path in such a way that after traversing said first reference path said second component optically interferes with said first component at said second beam splitter;

said optical means also being operable for splitting the other of said two beams into a third component and a fourth component, directing said third component to the surface of said platen in such a way that said third component traverses the round trip distance to said platen twice along separate but parallel paths, and for directing said fourth component along a second reference path in such a way that after traversing said second reference path said fourth component optically interferes with said third component at the beam splitting surface of said second beam splitter;

first detection means for detecting optical fringes produced by optical interference of said first and second components;

second detection means for detecting optical fringes produced by the optical interference of said third and fourth components; and output means for comparing outputs of said first and second detection means, and producing an output responsive to the absolute displacement of the surface of said simple less the absolute displacement of the surface of said platen.

2. A dilatometer as in claim 1 wherein:

said source means comprises a two-frequency laser producing a two-frequency light beam with a first linearly polarized component beam of a first frequency, and a second orthogonally linearly polarized component beam of a second frequency;

said optical means comprises a polarizing beam splitter for splitting each of said two beams into its two linearly polarized component beams, a first cube-corner reflector for reflecting said second and fourth component beams in said first and second reference paths, a second cube-corner reflector and a quarter wave plate for directing said first component beam to the surface of said platen and said third component beam to the surface of said sample;

said first and second detection means each comprise a polarizing analyzer and mixing means for producing an output signal whose frequency is the difference between the two frequencies of said two-frequency beam, doppler shifted in response to the motion of the surface of the platen in the case of said first detection means, and responsive to the motion of the surface of said sample in the case of said second detection means; and said output means comprises a reversible counter for counting in one direction the frequency of the output of said first detection means, counting in another direction the frequency of the output of said second detection means, and producing an output which is the accumulated difference of the counts in each direction.

3. A dilatometer as in claim 2, wherein:

said output means includes an electronic resolution extender for multiplying the doppler shift contribution to the output of said first detection means by a selected factor, multiplying the doppler shift contribution to the output of said second detection means by said selected factor minus one; and said reversible counter counts in one direction the frequency of the output of said resolution extender and counts in the other direction the output of said second detection means.

* * * * *

UNITED STATES PATENT OFFICE
CERTIFICATE OF CORRECTION

Patent No. 3,788,746         Dated January 29, 1974

Inventor(s) Richard R. Baldwin and Bruce J. Ruff

It is certified that error appears in the above-identified patent and that said Letters Patent are hereby corrected as shown below:

Column 5, line 7, change "simple" to -- specimen --;

Column 5, line 24, change "sample" to -- specimen --;

Column 6, line 7, change "sample" to -- specimen --.

Signed and sealed this 14th day of January 1975.

(SEAL)
Attest:

McCOY M. GIBSON JR.           C. MARSHALL DANN
Attesting Officer             Commissioner of Patents